United States Patent [19]

Thompson, Jr. et al.

[11] 4,237,510

[45] Dec. 2, 1980

[54] ELECTRICAL SWITCHING APPARATUS

[75] Inventors: Herbert A. Thompson, Jr., Cumberland, R.I.; Ronald E. Senor, North Attleboro; Louis C. Beggs, Attleboro, both of Mass.

[73] Assignee: Texas Instruments Incorporated, Attleboro, Mass.

[21] Appl. No.: 974,455

[22] Filed: Dec. 29, 1978

[51] Int. Cl.$^3$ .............................................. H02H 7/085

[52] U.S. Cl. .......................................... 361/24; 361/29; 318/783; 338/316; 337/102; 337/113; 337/95; 337/327; 337/380; 337/377

[58] Field of Search ......................... 361/27, 24, 25, 23, 361/28, 29, 31, 106, 165; 318/783, 784, 785, 788, 792; 338/20, 21, 57, 51, 52, 53, 220, 232, 260, 316, 320; 337/88, 102, 107, 112, 113, 95, 327, 354, 377, 380, 336

[56] References Cited

U.S. PATENT DOCUMENTS

| | | | |
|---|---|---|---|
| 3,988,709 | 10/1976 | McKinnon et al. | 338/220 X |
| 4,015,229 | 3/1977 | Senor et al. | 337/107 |
| 4,042,860 | 8/1977 | Woods et al. | 318/791 X |
| 4,084,202 | 4/1978 | Stoll | 361/24 |
| 4,092,573 | 5/1978 | D'Entremont | 318/783 |
| 4,131,871 | 12/1978 | Haag et al. | 338/220 |

*Primary Examiner*—Patrick R. Salce
*Attorney, Agent, or Firm*—John A. Haug; James P. McAndrews; Melvin Sharp

[57] ABSTRACT

A housing is disclosed in which a positive temperature coefficient (PTC) of resistivity element is mounted a selected distance from but in thermal communication with a thermostatic switch also mounted within the housing.

18 Claims, 14 Drawing Figures

ELECTRICAL SWITCHING APPARATUS

This invention relates generally to electrical switching apparatus and more specifically to a combination motor starter and protector.

A combination motor starter and protector comprising a solid state starting device having a resistor element with a positive temperature coefficient of resistivity (PTC) mounted between spring biased contacts in a housing of electrically insulative material and a motor protector having a thermally and electrically conductive can in which a thermostatic member is disposed mounted directly on the PTC housing in heat conductive relationship therewith is disclosed and claimed in U.S. Pat. No. 4,092,573 which issued June 30, 1978. As disclosed in that patent such apparatus is particularly useful for starting and protecting of refrigerator type compressors which typically comprise a compressor housing in which the compressor and compressor motor are disposed with connector pins extending through a wall of the housing. The combination motor starter and protector is formed with female sockets which receive the connector pins to provide means for energizing and deenergizing the compressor.

As disclosed in the referenced patent the degree of thermal coupling between the motor protector and the PTC pill is very important for the proper starting and protecting of the compressor and that in order to achieve the correct relationship a selected thermal resistance is placed between the protector and the PTC pill. However, in constructing devices in accordance with the teaching of the patent it was found that it is difficult to control the thermal coupling in a way conducive to mass production techniques. Mounting of the protector can directly onto the housing of the PTC pill tends to provide too much temperature influence on the protector from the PTC pill. That is, the protector becomes insufficiently sensitive to the temperature of the motor. While the introduction of additional thermal resistance between the protector and the PTC pill remedies this, it requires excessive customizing effort for an efficient manufacturing operation.

It is therefore an object of the invention to provide a combination motor protector and starter having a thermal path therebetween of a selected value which is particularly conducive to efficient manufacturing techniques. Another object is the provision of a combination protecting and starting device particularly useful with compressor motors which can be readily adapted for use with additional components and equipment, such as a run capacitor or a fan for the compressor.

Other objects and features of the invention will become more readily understood from the following detailed description and appended claims, when read in conjunction with the accompanying drawings in which like reference numerals designate like parts throughout the figures thereof.

Figure 1:
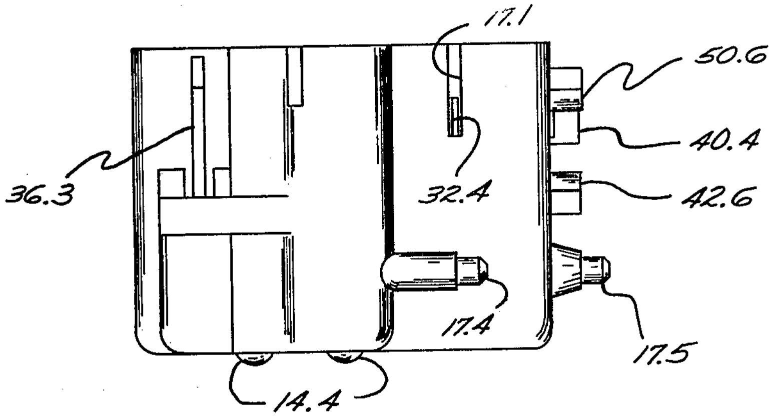
FIG. 1 is a front elevational view of a combination motor protector and starter apparatus made in accordance with the invention.
Figure 2:
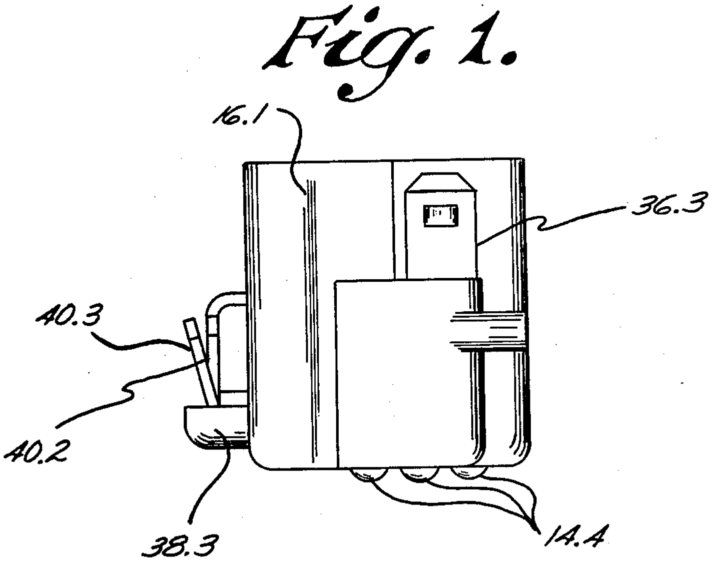
FIGS. 2-4 are left, right and back elevational views respectively of the FIG. 1 apparatus.
Figure 3:
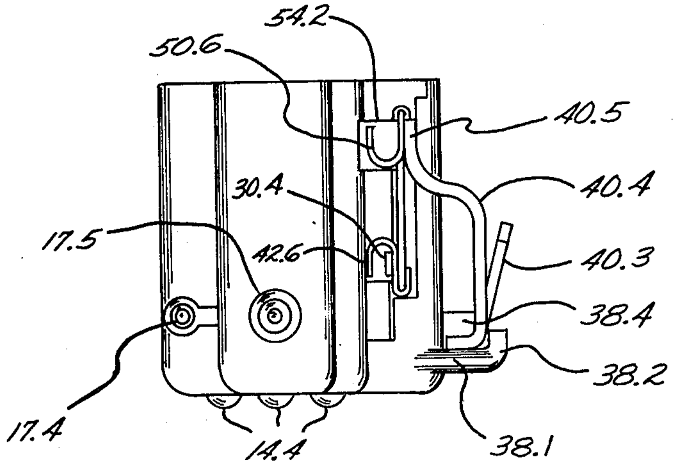
Figure 4:
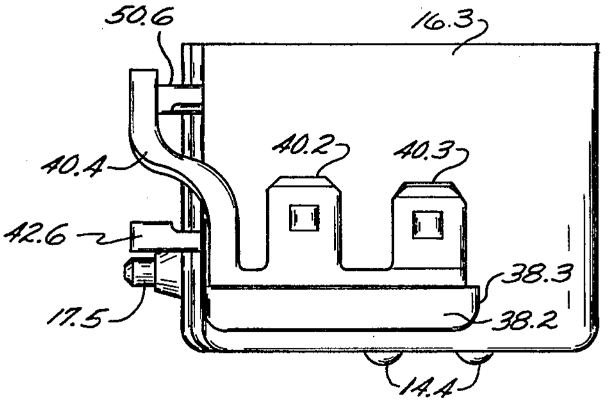

Briefly in accordance with the invention a housing of electrically insulative material has a bottom wall with pin connector apertures formed therein and upstanding front, back and side walls depending from the bottom wall and extending to an open end. The walls define a chamber which is divided into first and second chamber portions by a terminal plate received in a pair of opposed grooves formed in the side walls extending from the bottom wall to the open end. A second terminal plate is received in the second chamber portion in spaced relation to the first terminal plate with a PTC element received therebetween and located by a plurality of tab projections from the first terminal plate. A plurality of cantilever mounted fingers extend from the plates and contact opposite faces of the PTC pill to provide electrical connection thereto. The plates are also formed with female sockets which are aligned with respective pin connector apertures in the bottom wall. A slot is formed in a side wall in communication with the first chamber portion and an arm extends from the first terminal plate into the first chamber portion and through the slot. A motor protector comprising a can of thermally and electrically conductive material in which a thermostatic element is mounted and having a pair of terminals is seated in the first chamber portion with the terminals extending through the slot with one motor protector terminal contiguous to the arm of the first terminal plate. The seat for the motor protector is so located that a selected air space is disposed between the bottom of the motor protector and the first terminal plate. An elongated shelf is integrally formed on the back wall and is formed with a channel shaped recess open at one end and with a pair of tabs extending over the bottom surface of the shelf a selected distance therefrom. An elongated terminal bar is slidingly received in the recess and retained therein by the tabs. The terminal bar has two blades which project from the bar and a leg which extends from the bar to a point contiguous with the other motor protector terminal. A platform is also integrally attached to a side wall and is formed with a recess and a pin connector aperture in its bottom surface communicating with the recess and a blade receiving opening in its top surface. A connector is received in the recess with one portion formed as a female socket in alignment with the pin connector aperture, and another portion formed as a blade extending through the blade receiving opening. A slot is formed in the front wall and a capacitor connecting tab projecting from the second terminal plate extends therethrough to facilitate connection with a capacitor. Two pegs project outwardly from the wall of the housing, one of which is disposed beneath the capacitor connecting tab. The pegs are adapted to mount thereon capacitor terminals. A shelf and tab means are formed on the outer distal free ends of the housing. A lid which closes the open end of the housing is received on the shelf and snapped in place by the tab means.

Figure 7:
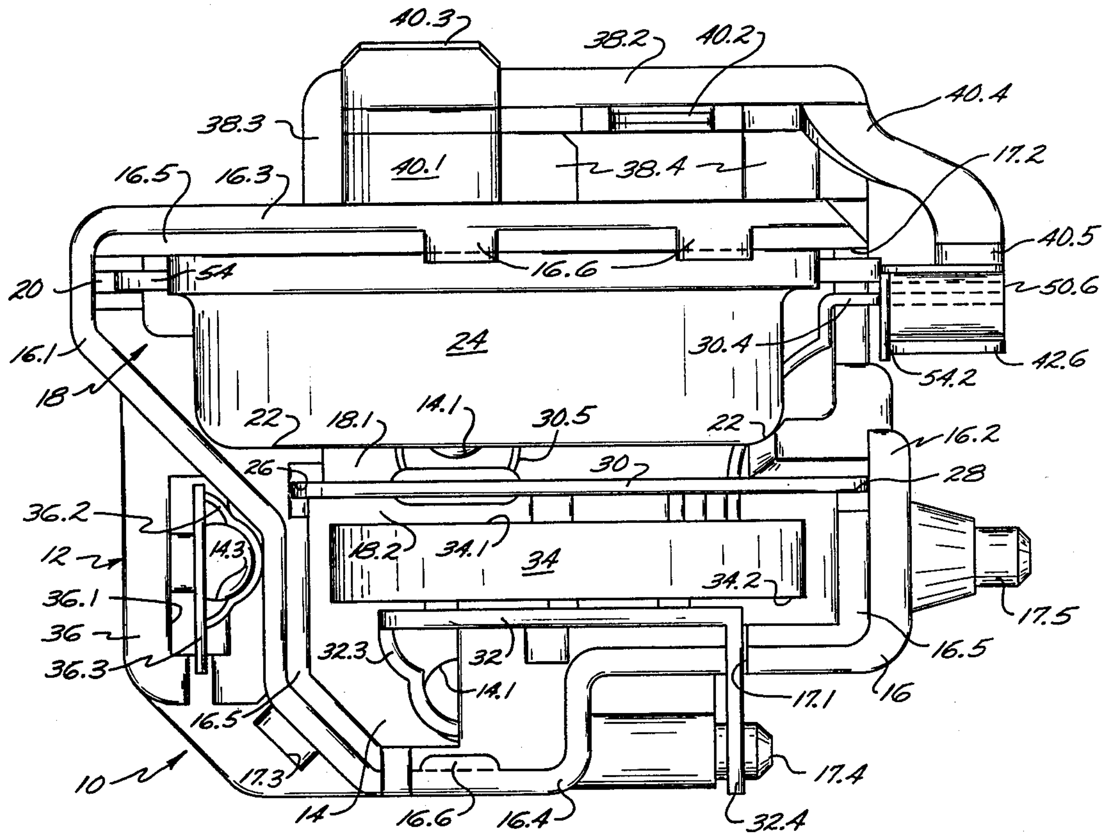
FIG. 7 is a top plan view similar to FIG. 6 but with the cover removed and shown in larger scale than FIG. 6.

Turning now to the drawings, with particular reference to FIG. 7 combination motor protector and starter device 10 comprises a housing 12 of electrically insulative material, such as Ryton or other moldable plastic having a bottom wall 14 and an upstanding wall 16 depending therefrom forming a chamber 18 therein. Bottom wall 14 is formed with pin connector apertures 14.1, 14.2 and 14.3 and projections 14.4 to act as stop surfaces to prevent injury to the glass header surrounding the pins. An upwardly extending groove 20 is formed in side walls 16.1 adjacent rear wall 16.3. A motor protector 24 is received in chamber 18 with one end of the protector slidably inserted into groove 20 and the terminals of the protector extending out through a slot 17.2 in side wall 16.2. Seating portion 22, in conjunction with groove 20 serves to fix the motor protector into a selected location within chamber 18.

Figure 5:
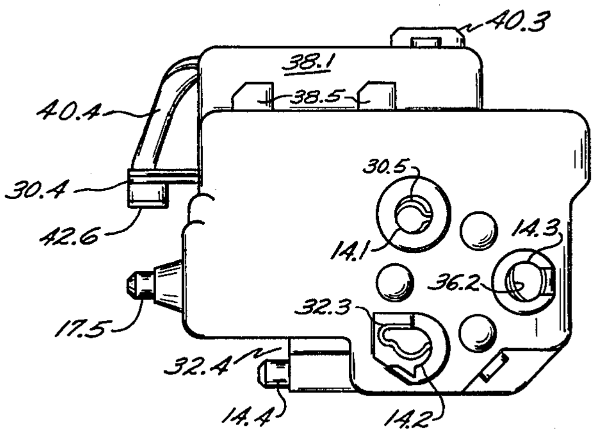
FIGS. 5 and 6 are bottom and top plan views respectively of the FIG. 1 apparatus.
Figure 6:
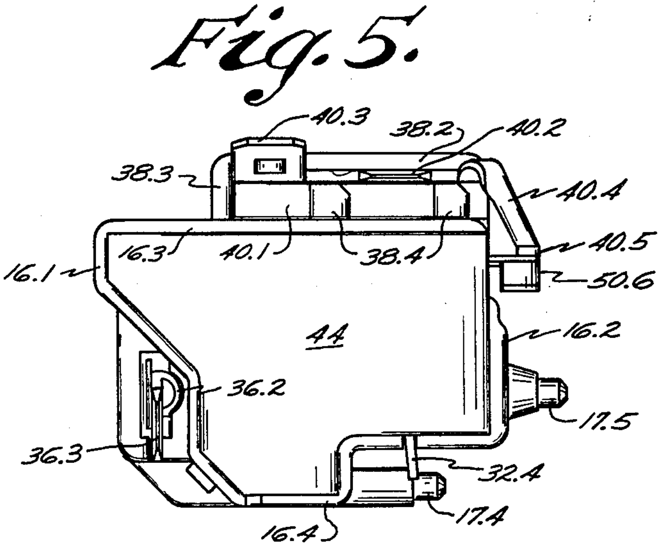
Figure 8:
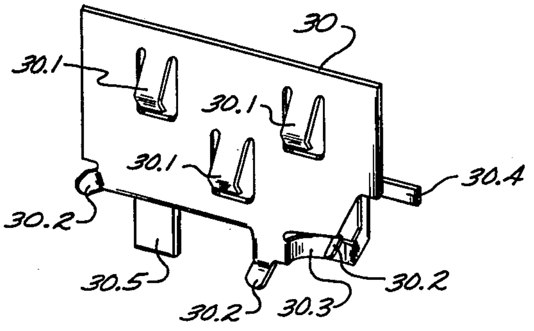
FIG. 8 is a perspective view of a first terminal plate used in the apparatus of FIGS. 1-7.

A second pair of opposed upwardly extending grooves 26, 28 are formed in side walls 16.1 and 16.2 intermediate motor protector 24 and front wall 16.4. A first terminal plate 30, also shown in FIG. 8 is slidingly received in grooves 26, 28 effectively dividing chamber 18 into a first motor protector section 18.1 and a second motor starter section 18.2. Terminal plate 30 is composed of electrically conductive material having good spring characteristics such as a tinned phosphor bronze and is generally rectangular shaped with a plurality of fingers 30.1 struck therefrom in cantilever fashion and bent out of the plane of the terminal plate. Fingers 30.1 are curled back toward the plate at their free distal ends to obtain a smooth contact surface at the portion of the fingers farthest removed from the plane of the plate. Three such fingers are shown but it is within the purview of the invention to vary the number either by providing more or less than three if desired. A plurality of tabs 30.2 are bent from plate 30 and extend generally 90° thereto and are arranged along an imaginary periphery of a circle. Tabs 30.2 are used to locate a PTC resistor to be described below. Arm 30.3 extends from plate 30 and is bent out of the plane of the plate so that its free distal end 30.4 is disposed contiguous a terminal of motor protector 24, to be described infra. Also depending from plate 30 is an arm 30.5 formed into a female socket which is aligned with aperture 14.1 in wall 14 (FIG. 5).

Figure 9:
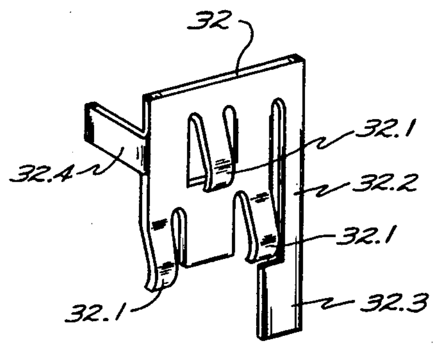
FIG. 9 is a perspective view of a second terminal plate used in the apparatus of FIGS. 1-7.

A second terminal plate 32, also shown in FIG. 9, formed of electrically conductive material having good spring characteristics such as tinned phosphor bronze is placed in chamber 18 in spaced relation to terminal plate 30. Terminal plate 32 is a generally flat rectangular plate with a plurality of fingers 32.1 struck from the plane of plate 32. Fingers 32.1 are curled back toward the plate at their free distal ends in the same manner as fingers 30.1 to obtain a smooth contact surface at the portion of the fingers furthest removed from the general plane of the plate. Again, while three fingers are shown it is within the purview of the invention to provide fewer than or more than three if desired. An arm 32.2 extends downwardly from plate 32 and has its distal free end 32.3 formed into a female socket configuration. A tab 32.4 is formed on one side of plate 32 and bent at a 90° angle back from the general plane of the plate. Terminal plate 32 is placed in chamber 18 with socket portion 32.3 aligned with an aperture 14.2 in bottom wall 14 (FIG. 5) and with tab 32.4 extending through a slot 17.1 formed in front wall 16.4. Tab 32.4 is provided to facilitate connection with a run capacitor should one be desired (see FIG. 14). In this connection two pegs 17.4 and 17.5 project from the housing for the purpose of mounting the capacitor terminals. Terminals plates 30 and 32 are disposed in chamber 18 so that the smooth contact portions of fingers 30.1 and 32.1 face each other.

A cylindrical resistor 34 having generally flat parallel faces 34.1, 34.2 is placed between terminals 30, 32 with tabs 30.2 locating the resistor in its proper location with fingers 30.1 and 32.1 in good electrical contact with opposite faces of the resistor. Resistor 34 is preferably composed of material having a steeply sloped positive temperature coefficient of resistivity (PTC) such as barium titanate doped with a rare earth. An example of such material is $Ba_{0.997}La_{0.003}TiO_3$. In order to permit electrical connection with resistor 34 electrically conductive coatings are placed on faces 34.1 and 34.2 using conventional materials and methods for applying such coatings. For instance, electroless nickel or flame sprayed aluminum and copper may be used. Tabs 30.2 project just beyond the edge of resistor 34 so that the resistor is properly seated without electrically shorting it. If desired tabs 30.2 can be coated with electrically insulative material and then the distance that the tabs extend from face 34.1 toward 34.2 would not be of any particular concern.

A platform 36 is integrally attached to side wall 16.1 and extends from a point below the top of wall 16 down to bottom wall 14 and is formed with a recess 36.1 which receives a terminal having a first female socket configuration 36.2 captured in the recess and aligned with aperture 14.3 in bottom wall 14 and second blade portion 36.3 projecting above platform 36. In the event that a double terminal for blade 36.3 is desired a slot 17.3 is provided to receive a locking tab from a quick connect (not shown). It will be noted that the female socket 36.2, along with female sockets 30.5 and 32.3 (see FIG. 5) are self aligning and can accomodate pins that are not precisely parallel or have some angularity. Socket 36.2 is free to move within its recess while sockets 30.5 and 32.3 are both located at the end of relatively long members which allow aligning movement as the device is plugged into the connector pins.

Figure 10:
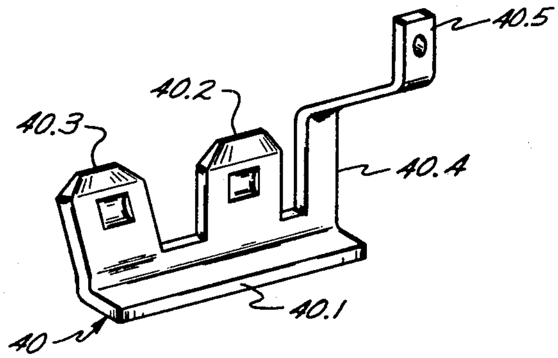
FIG. 10 is a perspective view of a terminal bar used in the apparatus of FIGS. 1-7.
Figure 11:
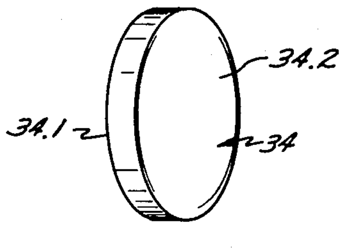
FIG. 11 is a perspective view of the PTC element used in the apparatus of FIGS. 1-7.

A shelf 38 is integrally attached to back wall 16.3 and is formed with a bottom wall 38.1, back lip 38.2, and one side lip 38.3 forming an elongated channel open at one end. Two tab portions 38.4 extend from back wall 16.3 a selected distance from wall 38.2 and spaced from bottom wall 38.1 while two cut out portions 38.5, generally the same size and configuration as tabs 38.4 and aligned with them are formed in bottom wall 38.1. Bar terminal member 40, shown in detail in FIG. 10, composed of suitable electrically conductive material such as tinned cold roll steel, comprising an elongated base 40.1 is slidingly received in the channel from the open end and is captured therein by tab portions 38.4 which extend over base 40.1. First and second blade terminals 40.2 and 40.3 project from base 40.1 and extend generally upwardly. Blade 40.3 is preferably bent slightly away from wall 16.3 to lie in a different plane than blade 40.2 in order to facilitate separate electrical connection with the blades. A leg 40.4 also projects from base 40.1 and is bent back toward the plane formed by back wall 16.3 and to the side thereof so that the distal end 40.5 is disposed contiguous to a terminal of motor protector 24, as will be explained below.

Figure 12:
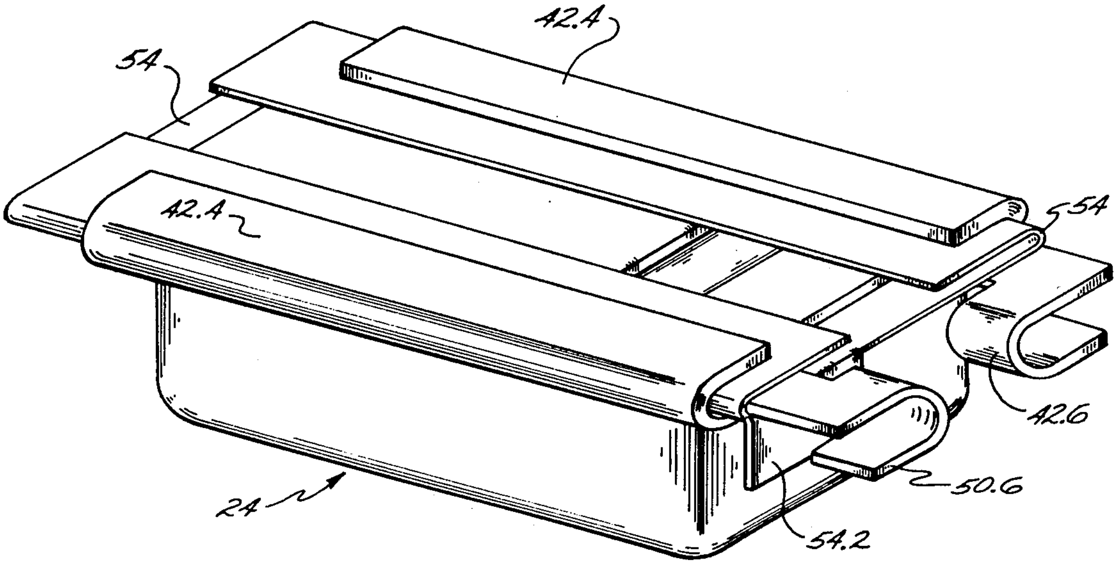
FIG. 12 is a perspective view of the motor protector used in the apparatus of FIGS. 1-7.
Figure 13:
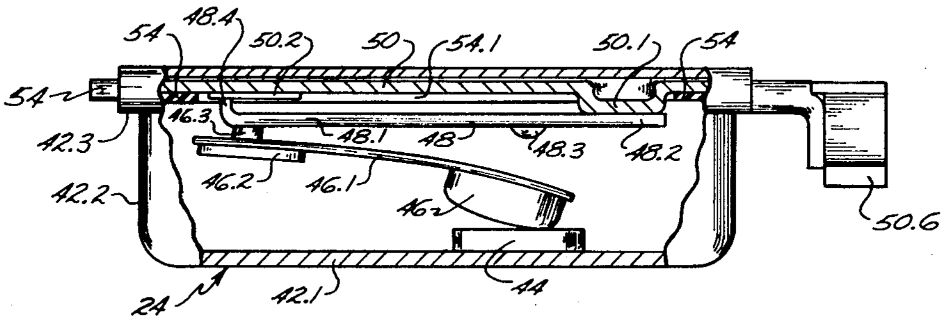
FIG. 13 is a front view, partly in cross section, of the FIG. 12 motor protector.

Motor protector 24 as best seen in FIGS. 12 and 13 comprises an electrically conductive, open ended can with a bottom wall 42.1 and upstanding side walls 42.2 forming a cavity therein. Attached to the free end of side walls 42.2 all around the perimeter is an outwardly extending flange portion 42.3. An extended lip portion 42.4 is attached preferably on two opposite sides of flange portion 42.3. A terminal 42.5 extends preferably from a corner of the can from flange portion 42.3 at another side of the can and is generally L-shaped in configuration. The bar portion 42.6 of the L is bent back upon itself to form the terminal. The can is typically made out of one piece of material such as low carbon steel.

Attached as by welding to bottom wall 42.1 is a stationary contact 44. Contact 44 is composed of a material of high electrical conductivity such as silver or a silver alloy.

Positioned to be movable into and out of engagement with stationary contact 44 is a movable contact 46 preferably composed of the same material as contact 44. Movable contact 46 is welded or otherwise secured to one end of a thermally responsive bimetallic member 46.1. Bimetallic member 46.1 is typically a dish shaped element having one layer of metal of a low thermal coefficient of expansion and another layer of metal of a somewhat higher thermal coefficient of expansion so that upon heating and cooling of member 46.1 it will snap between a position in which contacts 44, 46 are in engagement and one in which they are disengaged.

An opposite end of member 46.1 is secured as by welding to a flat heater element 48 having a first end 48.1 and a second end 48.2. A slug 46.2 of steel or other suitable material is preferably used to accurately cantilever mount member 46.1 to the first end 48.1 of heater 48. An aperture (not shown) is made in member 46.1 to receive a post portion 46.3 of slug 46.2.

Heater element 48 also has a dimple 48.3 to act as a positive stop for bimetallic member 46.1. Heater 48 is formed of any one of a variety of materials of selected electrical conductivity so that the heater is adapted to generate a predetermined amount of heat in response to a selected flow of current therethrough. For example, heater element 48 may be formed of rigid cold rolled steel to provide the element with physical stability and selected electrical heating characteristics.

Lid 50 of low carbon steel or other suitable electrically conductive material has a dimpled portion 50.1 to which heater end 48.2 is suitably attached as by welding. A high temperature electrically insulating patch 50.2 is adhered to the bottom surface of lid 50 to electrically isolate heater end 48.1 from lid 50. Polyimide resin such as that sold under the trade name "Kapton" is suitable for this purpose. Patch 50.2 may be adhered to lid 50 by a heat sensitive adhesive. Heater 48 is provided at end 48.1 with an upturned tab 48.4 which engages with patch 40.2 to accurately locate heater 48 within the can.

A gasket 54 is folded around the edges of lid 50 to electrically insulate lid 50 from the can. Gasket 54 is notched out at 54.1 essentially all along the length of heater 48. A tab 54.2 extends from one edge of gasket 54 and is used to prevent accidental shorting from a lead attached to terminal 50.6 and the can. Tab 54.2 provides a positive stop for the insertion of such a lead. Gasket 54 is made from an electrically insulating, compressible material such as "Nomex," a trademark of E. I. duPont DeNemours & Co., or the like.

Lid 50 insulated by gasket 54 is positioned to rest on flange portions 42.3 with a terminal 50.6 extending from lid 50 positioned adjacent terminal 42.6 but on the opposite corner of one of the sides of the can. Terminal 50.6 is formed similar to terminal 42.6 by turning the bar portion of an L shaped extension back upon itself. Once lid 50 is positioned extending lip portion 42.4 is bent to clampingly engage lid 50 and gasket 54 to the can.

Combination motor protector, starter device 10 is assembled by placing terminal 36.2 within recess 36.1, terminal plate 32 in chamber 18 with tab 32.4 extending through slot 17.1, and sliding terminal plate 30 into grooves 26, 28. PTC resistor 34 is then placed between the terminal plates. Motor protector 24 is then slid into place and terminal member 40 slid into the channel on shelf 38.

A flat plate like cover 44 of insulating material, such as glastic is received on a shelf 16.5 formed just below the top surface of side wall 16 and is held there by suitable means such as overhanging tabs 16.6. The device is then fully assembled and terminals 40.5 and 50.6 may then be suitably attached as by welding along with terminals 30.4 and 42.6.

While a particular motor protector has been shown in the drawings and described in the specification it should be appreciated that the combination device 10 can accomodate other types and sizes of motor protectors merely by providing appropriate seating means in the housing. For example, for particularly low current applications a considerably smaller protector, with or without its own heating element could be employed.

In the above described structure the thermal coupling between the PTC pill and the motor protector is optimized by using the air space between the motor protector can and contact plate 30. The specific thermal coupling is selected so that the ratio of the temperature of thermostatic element 46.1 above ambient temperature (with the motor protector deenergized) to the temperature of PTC pill 34 above ambient temperature is between approximately 0.2 and 0.4.

Figure 14:
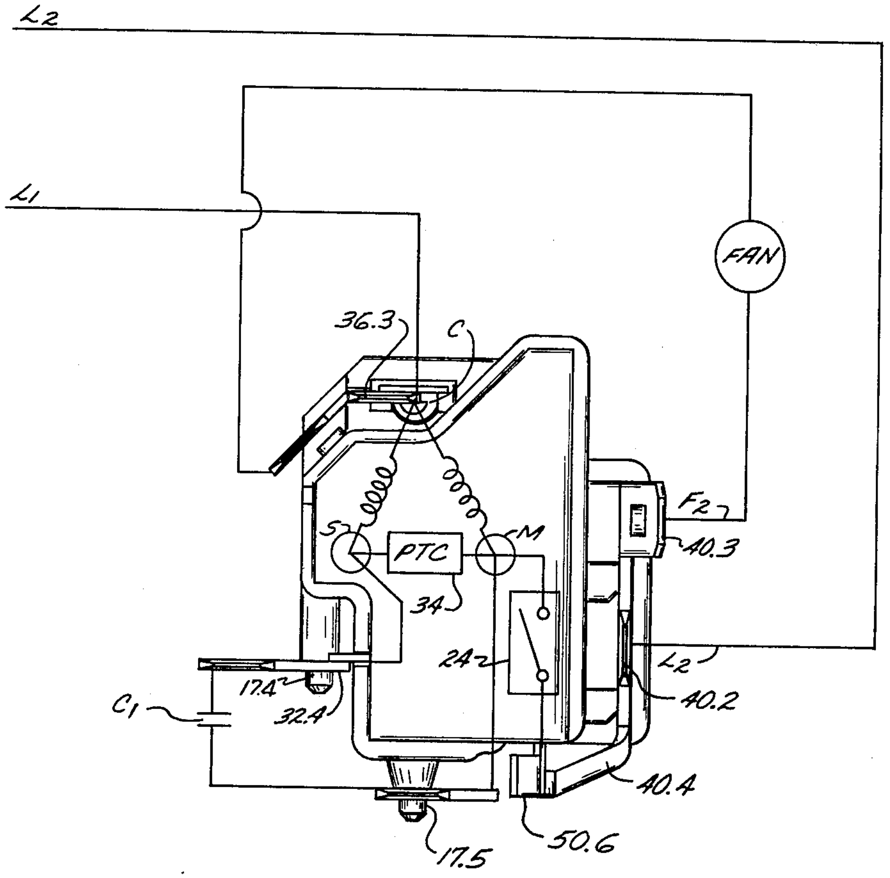
FIG. 14 is a schematic wiring diagram showing a typical application for the FIGS. 1-7 apparatus.

As seen in FIG. 14 in conjunction with FIG. 7 the pins C, S and M are received in pin connector sockets 36.2, 32.3 and 30.5 respectively. Pin C is common, pin S is attached to the start winding and pin M is attached to the main winding. Line $L_1$ is connectable to blade 36.3 while line $L_2$ is connectable to blade 40.2 of bar terminal 40. If it is desired to employ a fan it is connected to blade 40.3 of bar terminal 40 and a blade attachable to blade 36.3. Motor protector 24 is connected via terminal 50.6 to leg 40.4 of terminal bar 40 and 42.6 to arm 30.4 of terminal plate 30. PTC element 34 is energized through terminal plates 30, 32 which are attached to sockets 30.5, 32.3. If it is desired to employ capacitor $C_1$ it is connected to terminal 42.6 and tab 32.4.

In view of the above, the various objects of the invention have been met.

Various additional changes and modifications in the above-described invention will be readily apparent to those skilled in the art and any such changes or modifications are deemed to be within the spirit and scope of the present invention as set forth in the appended claims.

We claim:

1. Combination motor protector and starter apparatus comprising a housing of electrically insulative material having a bottom wall and upstanding front, back and side walls attached thereto and terminating at an opened end, the walls forming a chamber therein, a groove formed in each side wall extending generally from the bottom wall to the open end, the grooves opposed to each and forming a pair, a first terminal plate having two opposite edges slidably received in the pair of grooves and separating the chamber into a first and second portion, the plate having electrical contacting surfaces thereon, a second terminal plate received in the first chamber portion in spaced relation to the first terminal plate, the second plate having electrical contacting surfaces thereon, an electrical resistor in the form of an element having spaced contact surfaces received in the first chamber portion between the first and second terminal plates with the contact surfaces of the plates in electrical engagement with the respective contact surfaces of the resistor element, a motor protector having a housing, the motor protector mounted in the second chamber portion with the housing spaced a selected distance from the first terminal plate, electrical energizing means mounted in the housing, and lid means lockingly received at the open end of the housing to close the chamber.

2. Combination motor protector and starter apparatus according to claim 1 in which the electrical energizing means includes terminal means extending from the motor protector, one of the side walls having a slot defined therein in communication with the open end of the housing, the motor protector terminal means extending through the slot in the side wall.

3. Combination motor protector and starter apparatus according to claim 2 in which an elongated shelf projects outwardly from a wall of the housing and a terminal bar formed of electrically conductive material is mounted on the shelf, the bar having a leg extending therefrom with a distal free end portion disposed contiguous the motor protector terminal means.

4. Combination motor protector and starter apparatus according to claim 3 in which the shelf is formed with a channel like recess having a bottom wall and tab means project from the same wall of the housing as the shelf, the tab means spaced from the bottom wall of the shelf and adapted to retain the terminal bar which is slidingly received in the channel like recess between the tab means and the bottom wall.

5. Combination motor protector and starter apparatus according to claim 1 in which pin connector apertures are formed in the bottom wall and the terminal plates each have a female socket attached to the plates and aligned with a respective pin connector aperture.

6. Combination motor protector, starter apparatus according to claim 1 including first and second pegs projecting from the housing, the pegs adapted to mount capacitor terminals therein.

7. Combination motor protector, starter apparatus according to claim 2 in which an arm projects from the first terminal plate through the slot defined in the said one side wall contiguous the motor protector terminal means.

8. Combination motor protector, starter apparatus according to claim 2 in which the motor protector terminal means includes first and second terminals, a top one spaced over a bottom one, the first and second motor protector terminals each having a generally U-shaped end portion with the top one opening upwardly and the bottom one opening downwardly.

9. Combination motor protector, starter apparatus according to claim 8 in which the first terminal plate has an arm which projects therefrom through the slot defined in the said one side wall and received within the bottom U-shaped terminal end portion.

10. Combination motor protector, starter apparatus according to claim 1 in which a plurality of fingers are cantilever mounted on the first and second terminal plates, the fingers having curved free distal end portions which form the contact surfaces.

11. Combination motor protector, starter apparatus according to claim 10 in which each terminal plate is provided with three fingers, the fingers located such that two fingers in one plate are oppositely spaced from one finger in the other plate and two fingers in the other plate are oppositely spaced from one finger in the one plate.

12. Combination motor protector, starter apparatus according to claim 1 in which a plurality of locating tabs project from the first terminal plate in a direction toward the second terminal plate, the tabs located on the periphery of an imaginary circle and the resistor element is formed as a cylindrical element having a circumference generally the same as the imaginary circle.

13. Combination motor protector and starter apparatus comprising a housing of electrically insulative material having a bottom wall and upstanding front, back and side walls attached thereto and terminating at an opened end, the walls forming a chamber therein, a groove formed in each side wall extending generally from the bottom wall to the open end, the grooves opposed to each and forming a pair, a first terminal plate having two opposite edges slidably received in the pair of grooves and separating the chamber into a first and second portion, the plate having electrical contacting surfaces thereon, a second terminal plate received in the first chamber portion in spaced relation to the first terminal plate, the second plate having electrical contacting surfaces thereon, pin connector apertures formed in the bottom wall and the terminal plates each having a female socket attached to the plates and aligned with a respective pin connector aperture, a platform projecting from a wall of the housing the platform having a top and bottom surface, a recess formed in the platform, a pin connector aperture formed in the bottom surface in communication with the recess, a blade receiving opening formed in the top surface in communication with the recess and an electrically conductive connector received in the recess, the connector having an end formed into a female socket aligned with the pin connector aperture and another end formed into a blade which extends out of the recess through the blade receiving opening, an electrical resistor in the form of an element having spaced contact surfaces received in the first chamber portion between the first and second terminal plates with the contact surfaces of the plates in electrical engagement with the respective contact surfaces of the resistor element, a motor protector having a housing, the motor protector mounted in the second chamber portion with the housing spaced a selected distance from the first terminal plate, electrical energizing means mounted in the housing, and lid means lockingly received at the open end of the housing to close the chamber.

14. Combination motor protector, starter apparatus comprising a housing of electrically insulative material having a bottom wall and upstanding front, back and side walls attached thereto and terminating at an opened end, the walls forming a chamber therein, a groove formed in each side wall extending generally from the bottom wall to the open end, the grooves opposed to each and forming a pair, a first terminal plate having two opposite edges slidably received in the pair of grooves and separating the chamber into a first and second portion, the plate having electrical contacting surfaces thereon, a second terminal plate received in the first chamber portion in spaced relation to the first terminal plate, the second plate having electrical contacting surfaces thereon, first and second pegs projecting from the housing, the pegs adapted to mount capacitor terminals thereon, a tab receiving slot is formed in a wall of the housing adjacent to the second terminal plate and one of the first and second pegs, the tab receiving slot communicating with the open end of the housing, and the second terminal plate has a tab projecting therefrom through the tab receiving slot and adapted for connection to a capacitor terminal mounted on the said one of the first and second pegs, an electrical resistor in the form of an element having spaced contact surfaces received in the first chamber portion between the first and second terminal plates with the contact surfaces of the plates in electrical engagement with the respective contact surfaces of the resistor element, a motor protector having a housing, the motor protector mounted in the second chamber portion with the housing spaced a selected distance from the first terminal plate, electrical energizing means mounted in the housing, and lid means lockingly received at the open end of the housing to close the chamber.

15. Combination motor protector, starter apparatus comprising a housing of electrically insulative material having a bottom wall and upstanding front, back and side walls attached thereto and terminating at an opened end, the walls forming a chamber therein, a groove formed in each side wall extending generally from the bottom wall to the open end, the grooves opposed to each and forming a pair, a first terminal plate having two opposite edges slidably received in the pair of grooves and separating the chamber into a first and second portion, the plate having electrical contacting surfaces thereon, a second terminal plate received in the first chamber portion in spaced relation to the first terminal plate, the second plate having electrical contacting surfaces thereon, an electrical resistor in the form of an element having spaced contact surfaces received in the first chamber portion between the first and second terminal plates with the contact surfaces of the plates in electrical engagement with the respective contact surfaces of the resistor element, a motor protector having a housing, the motor protector mounted in the second chamber portion with the housing spaced a selected distance from the first terminal plate, electrical energizing means mounted in the housing including terminal means extending from the motor protector, including first and second terminals, a top one spaced over a bottom one, the first and second motor protector terminals each having a generally U-shaped end portion with the top one opening inwardly and the bottom one opening downwardly, one of the side walls having a slot defined therein in communication with the open end of the housing, the motor protector terminal means extending through the slot in the side wall, the first terminal plate has an arm which projects therefrom through the slot defined in the said one side wall and received within the bottom U-shaped terminal end portion, an elongated shelf projecting outwardly from a wall of the housing and a terminal bar formed of electrically conductive material mounted on the shelf, the bar having a leg extending therefrom with a distal free end portion disposed contiguous an outer surface of the upper U-shaped terminal end portion and, lid means lockingly received at the open end of the housing to close the chamber.

16. Combination motor protector, starter apparatus comprising a housing of electrically insulative material having a bottom wall and upstanding front, back and side walls attached thereto and terminating at an opened end, the walls forming a chamber therein, a groove formed in each side wall extending generally from the bottom wall to the open end, the grooves opposed to each and forming a pair, a first terminal plate having two opposite edges slidably received in the pair of grooves and separating the chamber into a first and second portion, the plate having electrical contacting surfaces thereon, a second terminal plate received in the first chamber portion in spaced relation to the first terminal plate, the second plate having electrical contacting surfaces thereon, an electrical resistor in the form of an element having spaced contact surfaces received in the first chamber portion between the first and second terminal plates with the contact surfaces of the plates in electrical engagement with the respective contact surfaces of the resistor element, a motor protector having a housing, the motor protector mounted in the second chamber portion with the housing spaced a selected distance from the first terminal plate, electrical energizing means mounted in the housing including terminal means extending from the motor protector, one of the side walls having a slot defined therein in communication with the open end of the housing, the motor protector terminal means extending through the slot in the side wall, an elongated shelf projecting outwardly from a wall of the housing and a terminal bar formed of electrically conductive material mounted on the shelf, the bar having a leg extending therefrom with a distal free end portion disposed contiguous the motor protector terminal means, a first blade extending from the bar in a direction generally parallel to the side wall from which the shelf projects and a second blade, spaced from the first blade, extending from the bar away from the side wall from which the shelf projects and lid means lockingly received at the open end of the housing to close the chamber.

17. Electrical switching apparatus comprising a housing of electrically insulative material having a bottom wall and upstanding front, back and side walls attached thereto and terminating at an open end, the walls forming a chamber therein, a slot defined in a side wall of the housing in communication with the open end, switching means disposed in the chamber, the switching means having a terminal extending through the slot, the back wall formed on an outside surface thereof with an elongated shelf projecting outwardly therefrom and a terminal bar formed of electrically conductive material is mounted on the shelf, the bar having a leg extending therefrom with a free distal end portion disposed contiguous the terminal extending through the slot, a first blade extending from the bar in a direction generally parallel to the back wall and a second blade, closely adjacent to and spaced from the first blade, extending from the bar away from the back wall.

18. Electrical switching apparatus comprising a housing of electrically insulative material having a bottom wall and upstanding front, back and side walls attached thereto and terminating at an open end, the walls forming a chamber therein, a slot defined in a side wall of the housing in communication with the open end, switching means disposed in the chamber, the switching means having a terminal extending through the slot, the back wall formed with an elongated shelf projecting outwardly therefrom, the shelf formed with a channel like recess open at an end thereof, and tab means projecting from the back wall spaced above the surface forming the bottom of the recess, and a terminal bar formed of electrically conductive material mounted on the shelf, the bar having a leg extending therefrom with a free distal end portion disposed contiguous the terminal extending through the slot, the bar having a first blade extending from the bar in a direction generally parallel to the back wall and a second blade, spaced from the first blade, extending from the bar away from the back wall, the terminal bar being adapted to be slidingly received in the channel like recess through the open end and retained therein by the tab means.

* * * * *